United States Patent
Ichinokawa

(10) Patent No.: US 11,200,806 B2
(45) Date of Patent: Dec. 14, 2021

(54) DISPLAY DEVICE, DISPLAY CONTROL METHOD, AND STORAGE MEDIUM

(71) Applicant: HONDA MOTOR CO., LTD., Tokyo (JP)

(72) Inventor: Jumpei Ichinokawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 180 days.

(21) Appl. No.: 16/558,448

(22) Filed: Sep. 3, 2019

(65) Prior Publication Data

US 2020/0082725 A1    Mar. 12, 2020

(30) Foreign Application Priority Data

Sep. 11, 2018  (JP) .............................. JP2018-169674

(51) Int. Cl.
    *G08G 1/16*    (2006.01)
    *B60W 50/14*   (2020.01)
    *B60K 35/00*   (2006.01)
    *G06K 9/00*    (2006.01)

(52) U.S. Cl.
    CPC ............. *G08G 1/167* (2013.01); *B60K 35/00* (2013.01); *B60W 50/14* (2013.01); *G06K 9/00798* (2013.01); *B60W 2050/146* (2013.01)

(58) Field of Classification Search
    CPC ............. B60K 2370/166; B60K 35/00; B60W 2050/146; B60W 50/14; G01C 21/3658; G06K 9/00798; G08G 1/096861; G08G 1/0969; G08G 1/167
    See application file for complete search history.

(56) References Cited

U.S. PATENT DOCUMENTS

| | | | |
|---|---|---|---|
| 2009/0143974 A1* | 6/2009 | Adachi | G01C 21/3658 701/532 |
| 2013/0030691 A1* | 1/2013 | Sumizawa | G09B 29/106 701/410 |
| 2016/0167514 A1* | 6/2016 | Nishizaki | G02B 27/01 345/7 |
| 2016/0349066 A1* | 12/2016 | Chung | G01C 21/3658 |
| 2017/0148327 A1* | 5/2017 | Sim | G08G 1/167 |

FOREIGN PATENT DOCUMENTS

| | | |
|---|---|---|
| JP | 09-171348 | 6/1997 |
| JP | 2015-155857 | 8/2015 |

OTHER PUBLICATIONS

Japanese Office Action for Japanese Patent Application No. 2018-169674 dated Oct. 12, 2021.

* cited by examiner

*Primary Examiner* — Omeed Alizada
(74) *Attorney, Agent, or Firm* — Amin, Turocy & Watson, LLP

(57) ABSTRACT

A display device includes a display that displays an image, a display controller that causes the display to display a first image indicating at least one of route information and road information on a route to a destination of a vehicle, and a determiner that determines that a traveling lane in which the vehicle is present among one or a plurality of lanes included in the route is a branch lane which branches from the route or a merge lane which merges into another lane, wherein the display controller causes the display to display a second image indicating that a branch point or a merge point is present ahead in a travel direction of the vehicle without displaying the first image when the determiner has determined that the traveling lane is the branch or merge lane.

8 Claims, 10 Drawing Sheets

… (5) … (6) … (7) …

DISPLAY DEVICE, DISPLAY CONTROL METHOD, AND STORAGE MEDIUM

CROSS-REFERENCE TO RELATED APPLICATION

This application is based upon and claims the benefit of priority from Japanese Patent Application No. 2018-169674, filed Sep. 11, 2018, the entire contents of which are incorporated herein by reference.

BACKGROUND

Field of the Invention

The present invention relates to a display device, a display control method, and a storage medium.

Description of Related Art

In the related art, a driving support system that displays a route to a destination on a screen to support a driver's driving is known. In this regard, a technology in which map data is acquired, position information of the vehicle is acquired, the number of lanes of the traveling road of the vehicle is determined on the basis of the map data and the position information of the vehicle, the traveling lane of the vehicle is recognized on the basis of the number of lanes and the map data, whether or not to change lanes at the current traveling point of the vehicle is determined, and a driving support screen for the vehicle including an image indicating a result of the determination as to whether or not to change lanes is generated when the number of lanes of the traveling road is two or more is known (see, for example, Japanese Unexamined Patent Application, First Publication No. 2015-155857).

SUMMARY

However, in the related art, when various types of information for driving support are displayed as an image, the driver may overlook important information in the image.

Aspects of the present invention have been made in view of such circumstances and it is an object of the present invention to provide a display device, a display control method, and a storage medium which can make it possible for a driver to easily recognize important information for driving support.

The display device, the display control method, and the storage medium according to the present invention adopt the following configurations.

(1) An aspect of the present invention provides a display device including a display configured to display an image, a display controller configured to cause the display to display a first image indicating at least one of route information and road information on a route to a destination of a vehicle, and a determiner configured to determine that a traveling lane in which the vehicle is present among one or a plurality of lanes included in the route is a branch lane which branches from the route or a merge lane which merges into another lane, wherein the display controller is configured to cause the display to display a second image indicating that a branch point or a merge point is present ahead in a travel direction of the vehicle without displaying the first image when the determiner has determined that the traveling lane is the branch lane or the merge lane.

(2) In the display device of the above aspect (1), the display controller is configured to cause the display to display the first image including some or all of a first element indicating a road sign of at least a recommended lane in which the vehicle is to travel among the one or plurality of lanes included in the route, a second element indicating that the vehicle is to change lanes to the recommended lane from the traveling lane when the traveling lane and the recommended lane are different, a third element indicating that the vehicle is to continue traveling in the traveling lane when the traveling lane and the recommended lane are the same, and a fourth element indicating a relative position of the recommended lane with respect to another lane among the one or plurality of lanes.

(3) In the display device of the above aspect (1) or (2), the display controller is configured to change a display mode of the second image in a first case where the determiner has determined that the traveling lane is the branch lane and a second case where the determiner has determined that the traveling lane is the merge lane.

(4) In the display device of the above aspect (3), the display controller is configured to cause the display to display the second image including, as an element, a first arrow indicating a direction from the branch lane to a first adjacent lane which is adjacent to the branch lane in the first case, and to cause the display to display the second image including, as an element, a second arrow indicating a direction from the merge lane to a second adjacent lane which is adjacent to the merge lane in the second case.

(5) In the display device of the above aspect (4), the display controller is configured to make an angle formed between a virtual line in the direction indicated by the first arrow and the first adjacent lane greater than an angle formed between a virtual line in the direction indicated by the second arrow and the second adjacent lane.

(6) In the display device of the above aspect (4) or (5), the display controller is configured to make a part of the first arrow overlap the first adjacent lane and make an entirety of the second arrow overlap the merge lane in the second image.

(7) In the display device of any one of the above aspects (4) to (6), the display controller is configured to display the second arrow at an angle nearly parallel to a merge angle of the merge lane.

(8) In the display device of any one of the above aspects (4) to (7), the display controller is configured to display the second arrow in a predetermined color for alerting an occupant of the vehicle more strongly than the first arrow does.

(9) The display device of any one of the above aspects (1) to (8) further includes an inputter configured to receive an operation from an occupant of the vehicle, wherein the display controller is configured to cause the display to display the first image without displaying the second image when an operation of setting the destination to a point connected from the branch lane has been input to the inputter and the determiner has determined that the traveling lane is the branch lane.

(10). Another aspect of the present invention provides a display control method for a computer mounted in a vehicle including a display configured to display an image, the display control method including the computer causing the display to display a first image indicating at least one of route information and road information on a route to a destination of a vehicle, determining that a traveling lane in which the vehicle is present among one or a plurality of lanes included in the route is a branch lane which branches from the route or a merge lane which merges into another lane, and causing the display to display a second image indicating that a branch point or a merge point is present ahead in a travel direction of the vehicle without displaying the first image upon determining that the traveling lane is the branch lane or the merge lane.

(11) Another aspect of the present invention provides a computer readable non-transitory storage medium storing a program for causing a computer mounted in a vehicle including a display configured to display an image to execute causing the display to display a first image indicating at least one of route information and road information on a route to a destination of a vehicle, determining that a traveling lane in which the vehicle is present among one or a plurality of lanes included in the route is a branch lane which branches from the route or a merge lane which merges into another lane, and causing the display to display a second image indicating that a branch point or a merge point is present ahead in a travel direction of the vehicle without displaying the first image upon determining that the traveling lane is the branch lane or the merge lane.

According to the above aspects (1) to (11), it is possible to make the driver easily recognize important information for driving support.

DESCRIPTION OF EMBODIMENTS

Hereinafter, embodiments of a display device, a display control method, and a storage medium of the present invention will be described with reference to the drawings. An embodiment will be described with reference to an example in which a display device is mounted in a vehicle including driving support devices such as advanced driver assistance systems (ADASs) and a navigation device for providing guidance on a route to a destination. Driving support in the embodiment includes, for example, an adaptive cruise control system (ACC), a lane keeping assistance system (LKAS), and a collision mitigation brake system (CMBS).

[Overall Configuration]

Figure 1:
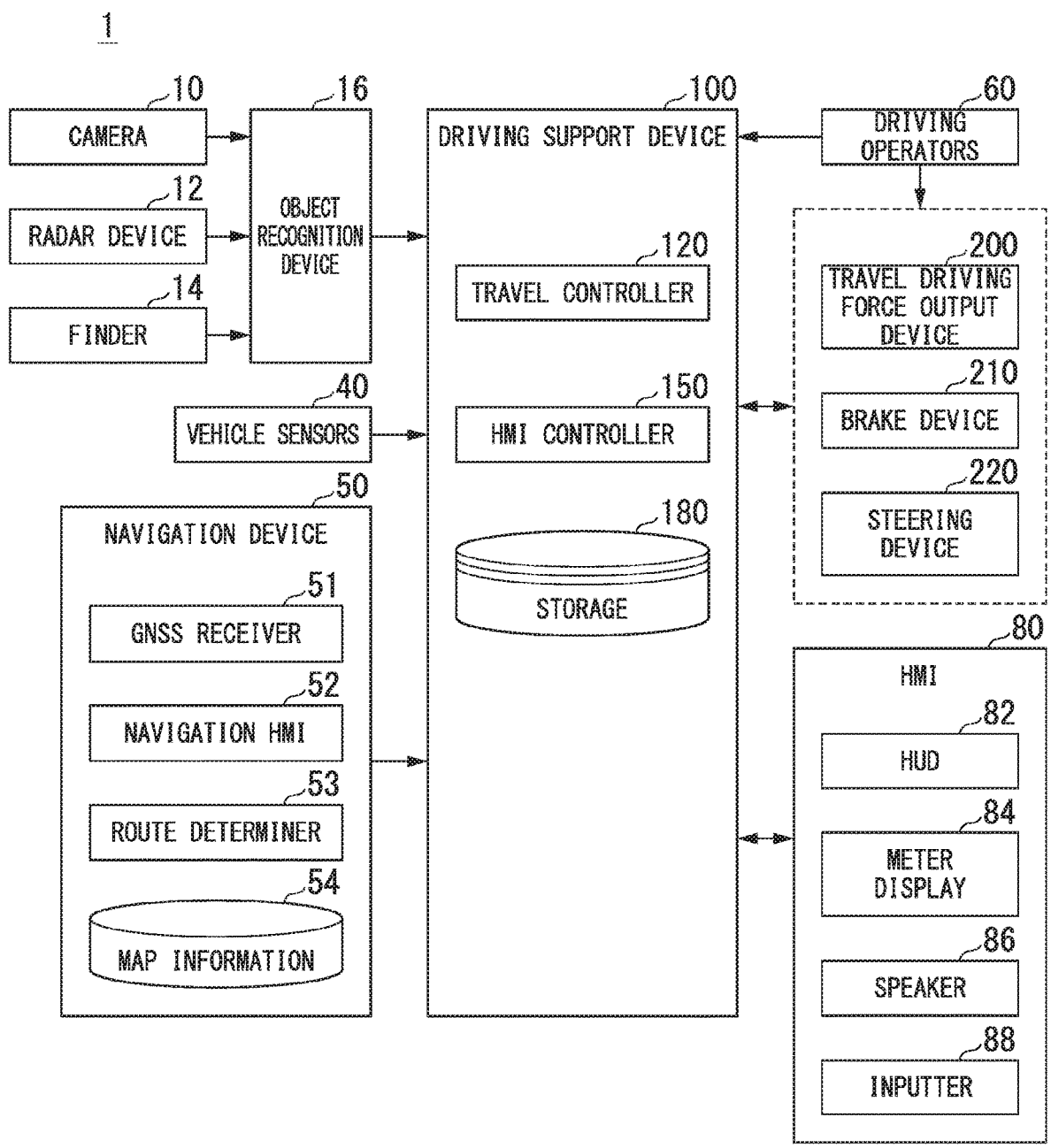
FIG. 1 is a configuration diagram of a vehicle system including a display device of an embodiment.

FIG. 1 is a configuration diagram of a vehicle system 1 including a display device of an embodiment. A vehicle in which the vehicle system 1 is mounted (hereinafter referred to as a vehicle M) is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

In FIG. 1, the vehicle system 1 includes, for example, a camera 10, a radar device 12, a finder 14, an object recognition device 16, vehicle sensors 40, a navigation device 50, driving operators 60, a human machine interface (HMI) 80, a driving support device 100, a travel driving force output device 200, a brake device 210, and a steering device 220. These devices or apparatuses are connected to each other by a multiplex communication line or a serial communication line such as a controller area network (CAN) communication line, a wireless communication network, or the like. The components of the vehicle system 1 shown in FIG. 1 are merely examples and some of the components may be omitted or other components may be added. A combination of an HMI 80 and an HMI controller 150 is an example of the "display device." One or a combination of more than one selected from the group consisting of a navigation HMI 52, an HUD 82, and a meter display 84 is an example of the "display."

The camera 10 captures images of the surroundings of the vehicle M and generates captured images. The camera 10 is, for example, a digital camera using a solid-state imaging device such as a charge coupled device (CCD) or a complementary metal oxide semiconductor (CMOS). The camera 10 is attached to the vehicle M in which the vehicle system 1 is mounted at an arbitrary location. The surroundings of the vehicle M include the area in front of the vehicle M, and may also include the area to the side of the vehicle M or the area behind the vehicle M. For example, for imaging the area in front of the vehicle M, the camera 10 is attached to an upper portion of a front windshield, a rear surface of a rearview mirror, or the like. The camera 10 may also be a stereo camera.

The radar device 12 radiates radio waves such as millimeter waves in predetermined radiation directions around the vehicle M and detects radio waves reflected by an object (reflected waves) to detect at least the position (distance and orientation) of the object. Objects are, for example, other vehicles, obstacles, and structures present near the vehicle M. One or a plurality of radar devices 12 may be attached to the vehicle M at arbitrary locations. The radar device 12 may also detect the position and speed of an object using a frequency modulated continuous wave (FMCW) method.

The finder 14 is a light detection and ranging or laser imaging detection and ranging (LIDAR) finder which measures scattered light in response to light radiated in predetermined radiation directions around the vehicle M to detect the distances to objects. One or a plurality of finders 14 may be attached to the vehicle M at arbitrary locations.

The object recognition device 16 performs a sensor fusion process on results of detection by some or all of the camera 10, the radar device 12, and the finder 14 to recognize the positions, types, speeds, or the like of objects present near the vehicle M. The object recognition device 16 may also recognize road shapes around the vehicle M through the sensor fusion process. The object recognition device 16 outputs the recognition result to the driving support device 100.

The vehicle sensors 70 include, for example, a vehicle speed sensor that detects the speed of the vehicle M (hereinafter also referred to as a vehicle speed), an acceleration sensor that detects the acceleration thereof, a yaw rate sensor that detects an angular speed thereof about the vertical axis, an orientation sensor that detects the orientation of the vehicle M, or the like.

The navigation device 50 includes, for example, a global navigation satellite system (GNSS) receiver 51, a navigation HMI 52, and a route determiner 53 and holds map information 54 in a storage device such as a hard disk drive (HDD) or a flash memory.

The GNSS receiver 51 identifies the position of the vehicle M on the basis of signals received from GNSS satellites.

The navigation HMI 52 includes a display device, a speaker, a touch panel, keys, and the like. The navigation HMI 52 may be partially or entirely shared with the HMI 80 which will be described later.

For example, the route determiner 53 determines a route from the position of the vehicle M identified by the GNSS receiver 51 (or an arbitrary input position) to a destination that an occupant (who may be the driver) has input using the navigation HMI 52 (which includes, for example, information regarding a waypoint when traveling to the destination) by referring to the map information 54.

Upon determining the route to the destination (hereinafter referred to as a target route), the route determiner 53 further divides the target route into a plurality of blocks (for example, into blocks each 100 meters long in the direction in which the vehicle M travels) and determines a recommended lane for each block by referring to the map information 54. The recommended lane represents a lane in which the vehicle M is to travel for each block. For example, the route determiner 53 performs a process of determining the number of the lane to travel in from the left as viewed in the travel direction as that of a recommended lane. When there is a branch point, a merge point, or the like on the target route, the route determiner 53 determines a recommended lane such that the vehicle M can travel on a reasonable route for proceeding to the branch destination. Upon determining the recommended lane, the route determiner 53 outputs information in which the recommended lane is associated with the target route to the driving support device 100.

The map information 54 is, for example, information representing shapes of roads by links indicating roads and nodes connected by the links. The links include, for example, a traffic message channel (TMC) link. For example, when an external server delivers traffic information to the vehicle M, the TMC link is information for specifying a road section indicated by the traffic information. For example, the TMC link is managed by an identification number that identifies each road section. The map information 54 may include link shapes, traffic regulations, road types, lane widths, the numbers of lanes, road structures, road curvatures, sign information, point of interest (POI) information, and the like. The sign information includes, for example, information such as road names, road identification information, speed limits, and traffic regulations (such as one-way traffic, straight lane, right turn lane, and no parking). The navigation device 50 may also perform route guidance using the navigation HMI 52 on the basis of the route determined by the route determiner 53.

The driving operators 60 are operators for the driver to control the steering and speed of the vehicle M by manual operation. The driving operators 60 include, for example, an accelerator pedal, a brake pedal, a shift lever, and a steering wheel.

The HMI 80 notifies an occupant in the vehicle M of various types of information and receives an input operation from the occupant. The HMI 80 includes, for example, various display devices such as the HUD 82 and the meter display 84, a speaker 86, and an inputter 88. The HMI 80 may also include a light emitter, a buzzer, a microphone, and the like. Details of the HMI 80 will be described later.

The driving support device 100 includes, for example, a travel controller 120, an HMI controller 150, and a storage 180. The travel controller 120 and the HMI controller 150 are realized by a processor such as a central processing unit (CPU) or a graphics processing unit (GPU) executing a program (software). One or both of the travel controller 120 and the HMI controller 150 may be realized by hardware (circuitry) such as a large scale integration (LSI), an application specific integrated circuit (ASIC), or a field-programmable gate array (FPGA) or may be realized by hardware and software in cooperation. The program referred to by the processor may be stored in advance in the storage 180 of the driving support device 100 or may be stored in a removable storage medium such as a DVD or a CD-ROM and then installed in the storage 180 by mounting the storage medium in a drive device of the driving support device 100.

The storage 180 is realized, for example, by an HDD, a flash memory, an electrically erasable programmable read only memory (EEPROM), a read only memory (ROM), or a random access memory (RAM). The storage 180 stores, for example, results of processing by the travel controller 120 and the HMI controller 150 in addition to the program read and executed by the processor.

Upon receiving an instruction to start operation of the travel controller 120 through the HMI 80, the travel controller 120 executes driving support control such as ACC, LKAS, or CMBS on the basis of information obtained from the object recognition device 16 or the vehicle sensors 40 until an instruction to end operation of the travel controller 120 is received or until the vehicle M arrives at the destination.

For example, when executing the ACC, the travel controller 120 controls the travel driving force output device 200 and the brake device 210 on the basis of information that is input from the camera 10, the radar device 12, and the finder 14 via the object recognition device 16 such that the vehicle M travels while keeping a constant inter-vehicle distance (relative distance) between the vehicle M and a preceding vehicle. That is, the travel controller 120 performs acceleration/deceleration control (speed control) based on the inter-vehicle distance between the vehicle M and the preceding vehicle.

When executing the LKAS, the travel controller 120 controls the steering device 220 such that the vehicle M travels while keeping the current traveling lane (performing lane keeping). That is, the travel controller 120 performs steering control for lane keeping.

When executing the CMBS, the travel controller 120 controls the travel driving force output device 200 and the brake device 210 such that the vehicle M avoids contact with an obstacle whose distance to the vehicle M is decreasing. That is, the driving support device 100 performs acceleration/deceleration control (particularly, deceleration control) for avoiding contact between the vehicle M and the obstacle.

The HMI controller 150 controls the HMI 80 to notify the driver of information regarding driving support. The information regarding driving support includes, for example, information regarding shapes of the road near the vehicle M, operating states of the driving support functions (for example, ACC, LKAS, and CMBS) executed by the driving support device 100, information regarding the recommended lane, and information regarding road signs. The HMI controller 150 may also control the HMI 80 to notify the driver of information regarding lane change.

The information regarding lane change includes, for example, lane change guidance information for providing guidance informing (notifying) the driver that it is necessary to change lanes and lane change unnecessary information for providing guidance informing (notifying) the driver that it is unnecessary to change lanes. Details of the functions of the HMI controller 150 will be described later.

The travel driving force output device 200 outputs a travel driving force (torque) required for the vehicle M to travel to driving wheels. The travel driving force output device 200 includes, for example, a combination of an internal combustion engine, an electric motor, a transmission, and the like and an electronic control unit (ECU) that controls them. The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the driving operator 60 or the travel controller 120 such that a brake torque corresponding to a braking operation is output to each wheel. The steering device 220 includes, for example, a steering ECU and an electric motor. The steering ECU drives the electric motor according to information input from the driving operator 60 or information input from the travel controller 120 to change the direction of the steered wheels.

[Configuration of HMI]

Figure 2:
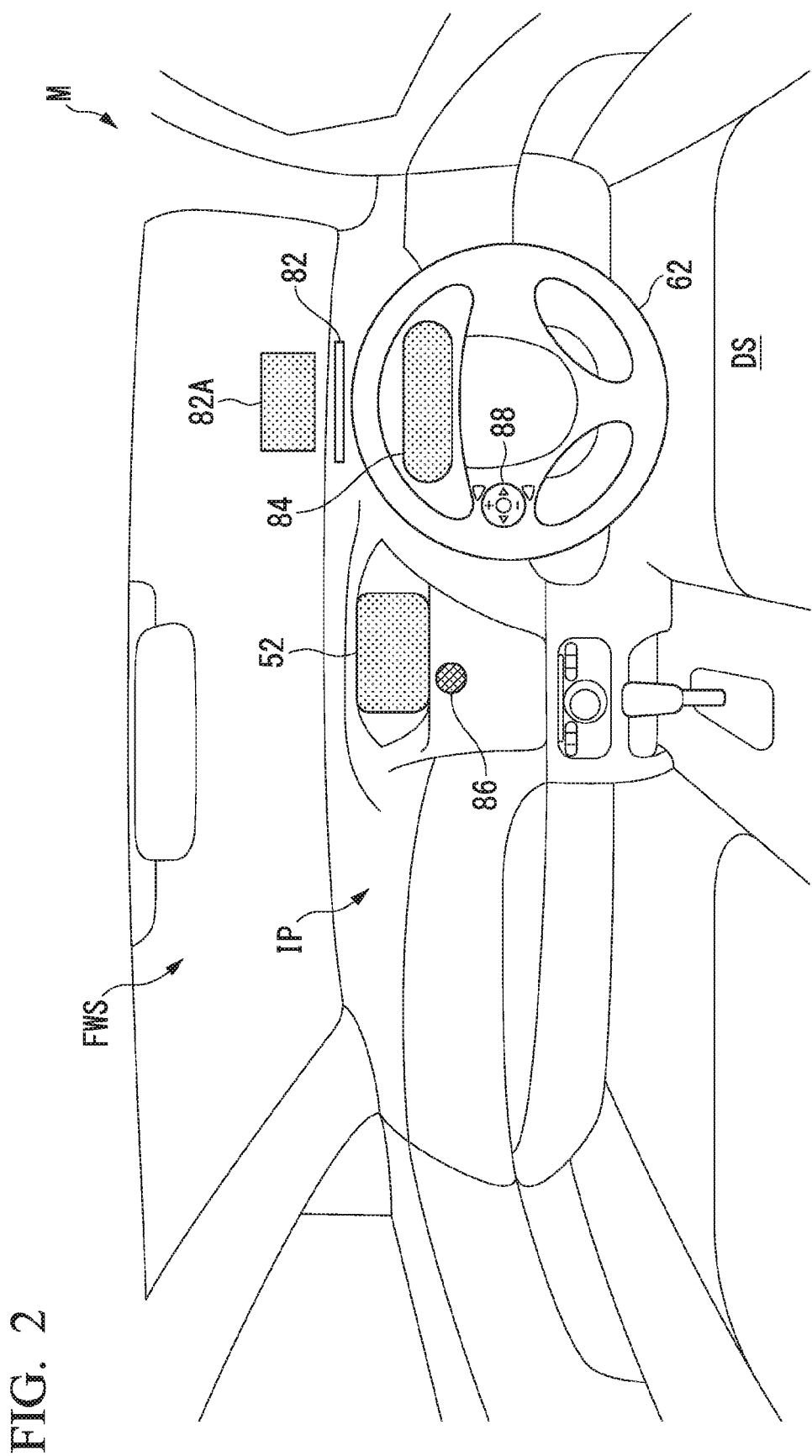
FIG. 2 is a diagram showing the appearance of an occupant compartment of a vehicle M in which each unit of an HMI is mounted.

The configuration of the HMI 80 will be described below. FIG. 2 is a diagram showing the appearance of the occupant compartment of the vehicle M in which each unit of the HMI 80 is mounted. The navigation HMI 52 is a display device such as a liquid crystal display (LCD) or an organic electroluminescence (EL) display disposed near the center of an instrument panel IP as shown in FIG. 2. The navigation HMI 52 may include, for example, a touch panel that receives an input operation from the occupant. The navigation HMI 52 displays the target route determined by the route determiner 53 such that the target route is superimposed on a map indicated by the map information 54. The navigation HMI 52 may display the information regarding driving support, the information regarding lane change, or the like as an image under control of the HMI controller 150.

The HUD 82 is provided on or in the instrument panel IP and casts (projects) light including an image on a display area 82A on a part of a front windshield FWS in front of a driver's seat DS to allow the driver seated in the driver's seat DS to view a virtual image. The front windshield FWS is a member having light transparency such as glass. The HUD 82 may be realized by a display device having light transparency (for example, a liquid crystal display or organic EL display) attached to the front windshield FWS. Light may also be projected on a transparent member (such as a visor or a lens of glasses) included in a device which a human being mounts on his or her body or a light transmissive display device may be attached to the device.

The HUD 82 allows the driver to view, for example, an image, which is obtained by imaging the information regarding driving support or the information regarding lane change described above, as a virtual image VI. The HUD 82 may also allow the driver to view an image, which is obtained by imaging the vehicle speed, the driving force distribution ratio, the engine speed, the operation states of the driving support functions (for example, ACC, LKAS, and CMBS), the shift position, or the like, as a virtual image. Hereinafter, causing, by the HMI controller 150, the HUD 82 to execute this process is referred to as "causing the HUD 82 to display an image."

The meter display 84 is, for example, a display device which is provided on the instrument panel IP near the front of the driver's seat DS and which the driver can view through the gap of the steering wheel 62, which is an example of the driving operator 60, or can view over the steering wheel 62. The meter display 84 is, for example, a display device such as an LCD or an organic EL display. The meter display 84 displays, for example, a meter such as a speedometer or a tachometer as an image. The meter display 84 may display the information regarding driving support or the information regarding lane change described above as an image in addition to or instead of the meter.

The speaker 86 is provided, for example, on the instrument panel IP. The speaker 86 may also be provided on a door, a ceiling, a seat or the like. The speaker 86 outputs the information regarding driving support or the information regarding lane change described above as a sound to the occupant compartment.

The inputter 88 is, for example, a switch, a button, or a touch panel that can be operated by the driver. As in the shown example, the inputter 88 may be provided on the steering wheel 62 or may be provided on the instrument panel IP at an arbitrary location. For example, the inputter 88 may receive an operation of resetting the destination or an operation of changing all or a part of the target route from the driver.

[Configuration of HMI controller]

Figure 3:
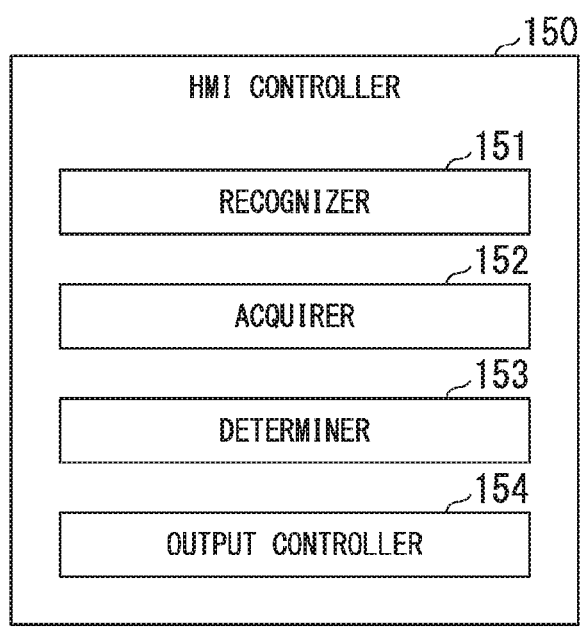
FIG. 3 is a functional configuration diagram of an HMI controller of the embodiment.

Hereinafter, an exemplary configuration of the HMI controller 150 will be described. FIG. 3 is a functional configuration diagram of the HMI controller 150 of the embodiment. The HMI controller 150 includes, for example, a recognizer 151, an acquirer 152, a determiner 153, and an output controller 154. The output controller 154 is an example of the "display controller."

The recognizer 151 recognizes states of an object present near the vehicle M such as the position, speed and acceleration thereof on the basis of information that is input from the camera 10, the radar device 12, and the finder 14 via the object recognition device 16. The position of the object may be recognized, for example, as a position in absolute coordinates whose origin is at a representative point of the vehicle M (such as the center of gravity or the center of the drive shaft). The position of the object may be represented by a representative point such as a center of gravity or a corner of the object or may be represented by an expressed region. The "states" of the object may include an acceleration or jerk of the object or a behavior state (for example, whether or not the object is changing or is going to change lanes).

The recognizer 130 recognizes, for example, a traveling lane in which the vehicle M is traveling. The recognizer 130 recognizes the traveling lane of the vehicle M, for example, by comparing a pattern of road lane lines (for example, an arrangement of solid and broken lines) included in the map information 54 with a pattern of road lane lines near the vehicle M recognized from an image captured by the camera 10. The recognizer 130 may recognize the traveling lane of the vehicle M by recognizing travel boundaries (road boundaries) including road lane lines, road shoulders, curbs, a median strip, guardrails, or the like, without being limited to road lane lines. This recognition may be performed taking into consideration a position of the vehicle M acquired from the navigation device 50 or a result of processing by the INS. The recognizer 130 may also recognize temporary stop lines, obstacles, red lights, toll gates, and other road phenomena.

Upon recognizing the traveling lane, the recognizer 130 may further recognize the position and attitude of the vehicle M with respect to the recognized traveling lane.

The acquirer 152 acquires information regarding a recommended lane, which is associated with the target route, from the navigation device 50.

The determiner 153 determines whether or not a traveling lane, in which the vehicle M is traveling, included in one or a plurality of lanes included in the target route is a branch lane which branches from the target route on the basis of the recognition result of the recognizer 151 and the map information 54. Hereinafter, a point on the target route where at least one lane included in the target route is a branch lane will be described as a "branch point Pa."

The determiner 153 determines whether or not the traveling lane of the vehicle M is a merge lane which merges into another lane among one or a plurality of lanes included in the target route. Hereinafter, a point on the target route where a lane included in the target route is a merge lane will be described as "a merge point Pb."

The determiner 153 determines whether or not the traveling lane of vehicle M is a recommended lane determined by route determiner 53 on the basis of the recognition result of recognizer 151 and the information acquired by acquirer 152.

The output controller 154 causes the HMI 80 to output the information regarding driving support according to the determination result of the determiner 153.

Figure 4:
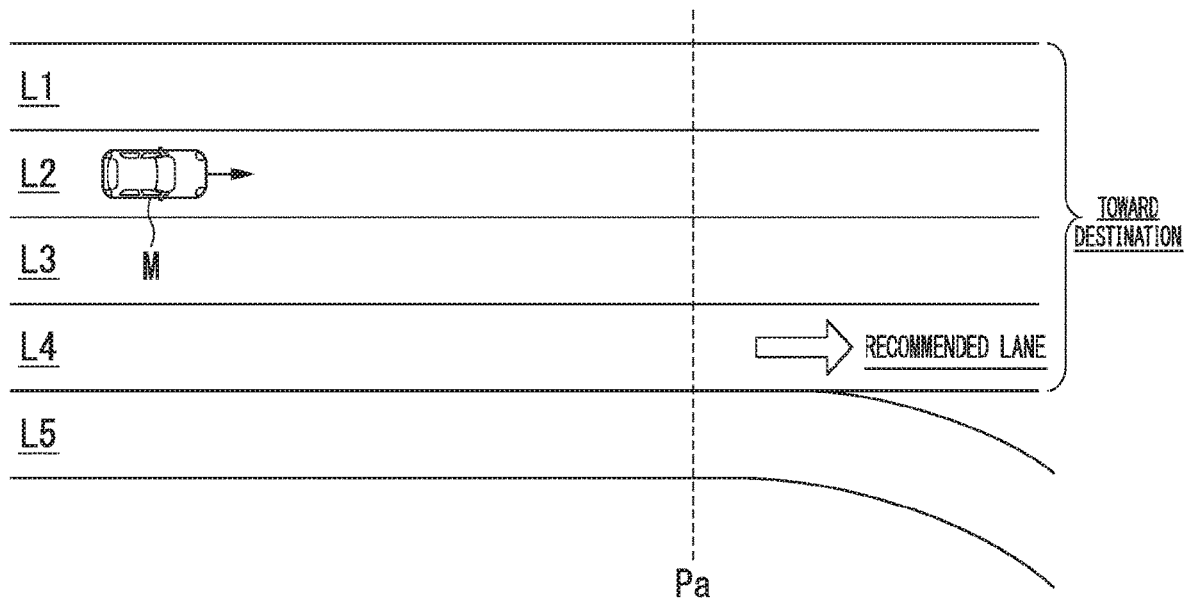
FIG. 4 is a diagram showing an example of a situation in which a branch point is present on a target route.

FIG. 4 is a diagram showing an example of a situation in which a branch point Pa is present on a target route. The shown example indicates that the target route includes five lanes L1 to L5 and the vehicle M is traveling in the lane L2 among the five lanes. That is, the lane L2 is a traveling lane. In the shown example, the lane L4 is a recommended lane and the lane L5 is a branch lane. A destination is present on an extension of the lanes L1 to L4 excluding the lane L5 which is the branch lane, and is not present on an extension of the lane L5 which is the branch lane. The right side in the figure is the travel direction of the vehicle M.

In such a situation, the determiner 153 determines that the traveling lane L2 is not a branch lane and not the recommended lane. When the determiner 153 has determined that the traveling lane is not a branch lane and not the recommended lane in the situation in which the branch point Pa is present on the target route, the output controller 154 causes at least one display device among the HUD 82 of the HMI 80 or the meter display 84A to display a first route guidance image IM1. The first route guidance image IM1 is an image including at least one of route information and road information. For example, the route information includes the information regarding the recommended lane described above or the like and the road information includes the information regarding road signs described above or the like. The first route guidance image IM1 is an example of the "first image."

Figure 5:
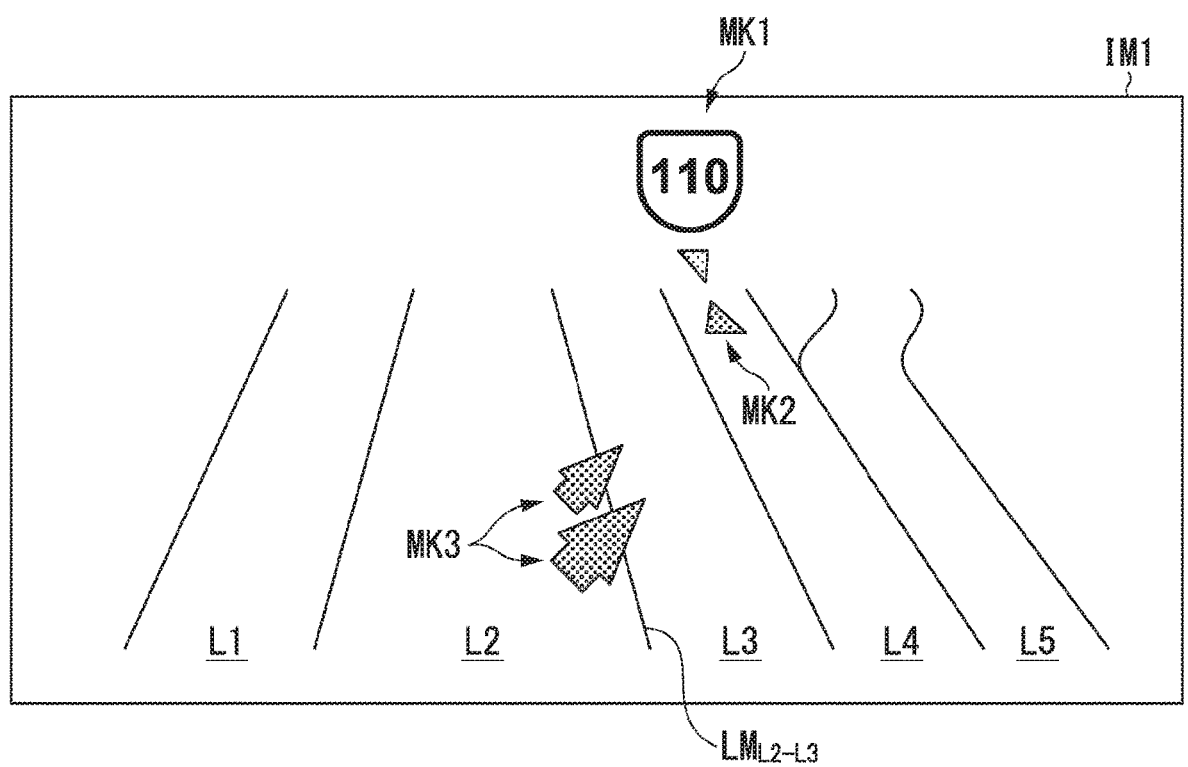
FIG. 5 is a diagram showing an example of a first route guidance image.

FIG. 5 is a diagram showing an example of the first route guidance image IM1. For example, the first route guidance image IM1 is an image including lane lines that divide lanes L1 to L5, a sign mark MK1, a recommended lane mark MK2, and a lane change mark MK3 as elements (objects). The lane lines of the lanes are image elements corresponding to information regarding shapes of the road among a plurality of pieces of information included in the information regarding driving support described above.

The sign mark MK1 is a mark indicating a road sign of the recommended lane, and is, for example, disposed above the recommended lane. The shown example indicates that the sign mark MK1 is disposed above the lane L4 since the lane L4 is the recommended lane and further indicates that the recommended lane L4 is a lane of route No. 110. The sign mark MK1 is an image element corresponding to information regarding road signs among the plurality of pieces of information included in the information regarding driving support described above. The sign mark MK1 is an example of the "first element."

The recommended lane mark MK2 is a mark indicating which of one or more lanes included in the target route is the recommended lane. In the shown example, the recommended lane mark MK2 is disposed on the lane L4 since the lane L4 is the recommended lane.

When the route determiner 53 has determined that a plurality of lanes are recommended lanes, the recommended lane mark MK2 may be disposed on each of the plurality of lanes determined as recommended lanes. The recommended lane mark MK2 is an image element corresponding to information regarding the recommended lane among the plurality of pieces of information included in the information regarding driving support described above. The recommended lane mark MK2 is an example of the "fourth element."

The lane change mark MK3 is a mark that, when the traveling lane of the vehicle M and the recommended lane are different, prompts the driver to change lanes from the traveling lane to the recommended lane by indicating the direction in which the recommended lane is present (right or left) when viewed from the traveling lane of the vehicle M. For example, the lane change mark MK3 may be represented by an arrow symbol. In the shown example, the recommended lane L4 is one lane to the right of the traveling lane L2. In this case, the lane change mark MK3 is disposed such that a direction indicated by the arrow is inclined to the right with respect to the extending direction of the traveling lane L2. At this time, the arrow representing the lane change mark MK3 may be disposed over both the traveling lane L2 and the lane L3 adjacent to the traveling lane L2 in the first route guidance image IM1. Specifically, the lane change mark MK3 is disposed in the first route guidance image IM1 such that a part of the arrow representing the lane change mark MK3 overlaps a lane line $LM_{L2-L3}$ that divides the traveling lane L2 and the lane L3 from each other. In the shown example, the lane change mark MK3 is formed of a combination of two arrows. However, the present invention is not limited to this and the lane change mark MK3 may be formed of one arrow or three or more arrows. The lane change mark MK3 is an image element corresponding to lane change guidance information among the plurality of pieces of information included in the information regarding driving support described above. The lane change mark MK3 is an example of the "second element."

Figure 6:
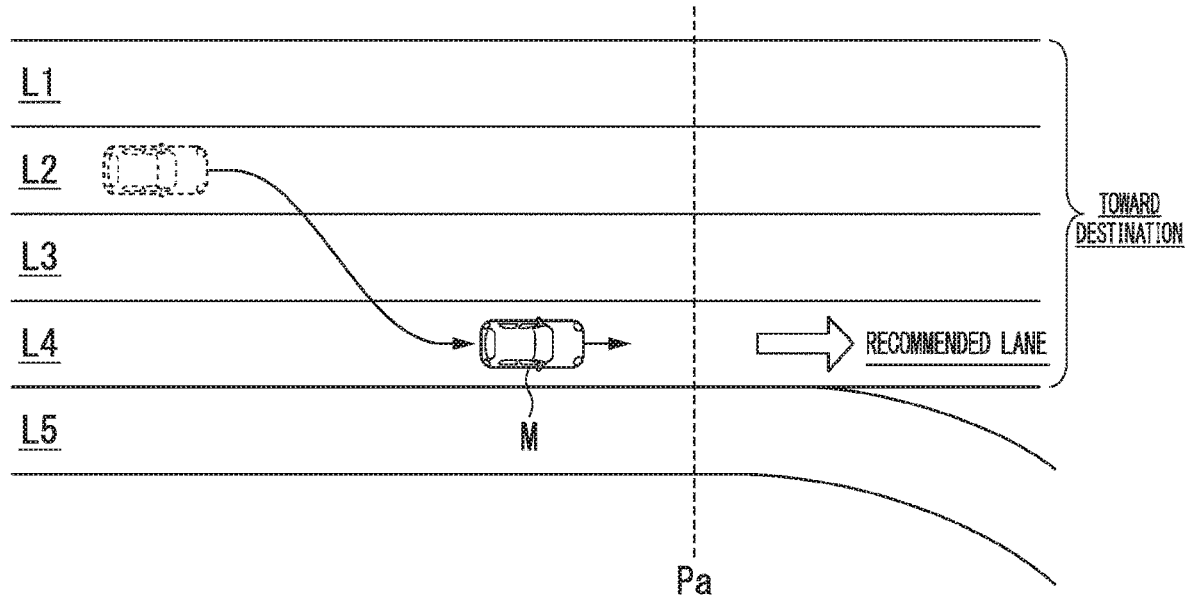
FIG. 6 is a diagram showing another example of a situation in which a branch point is present on a target route.

FIG. 6 is a diagram showing another example of a situation in which a branch point Pa is present on a target route. The shown example indicates a situation in which the vehicle M has changed lanes from the lane L2 to the lane L4 which is the recommended lane in the situation shown in FIG. 4. In such a situation, the determiner 153 determines that the traveling lane L4 is not a branch lane but a recommended lane. When the determiner 153 has determined that the traveling lane is not a branch lane but a recommended lane in the situation in which the branch point Pa is present on the target route, the output controller 154 causes at least one display device among the HUD 82 of the HMI 80 or the meter display 84 to display a second route guidance image IM2. Similar to the first route guidance image IM1, the second route guidance image IM2 is an image including at least one of route information and road information. The second route guidance image IM2 is another example of the "first image."

Figure 7:
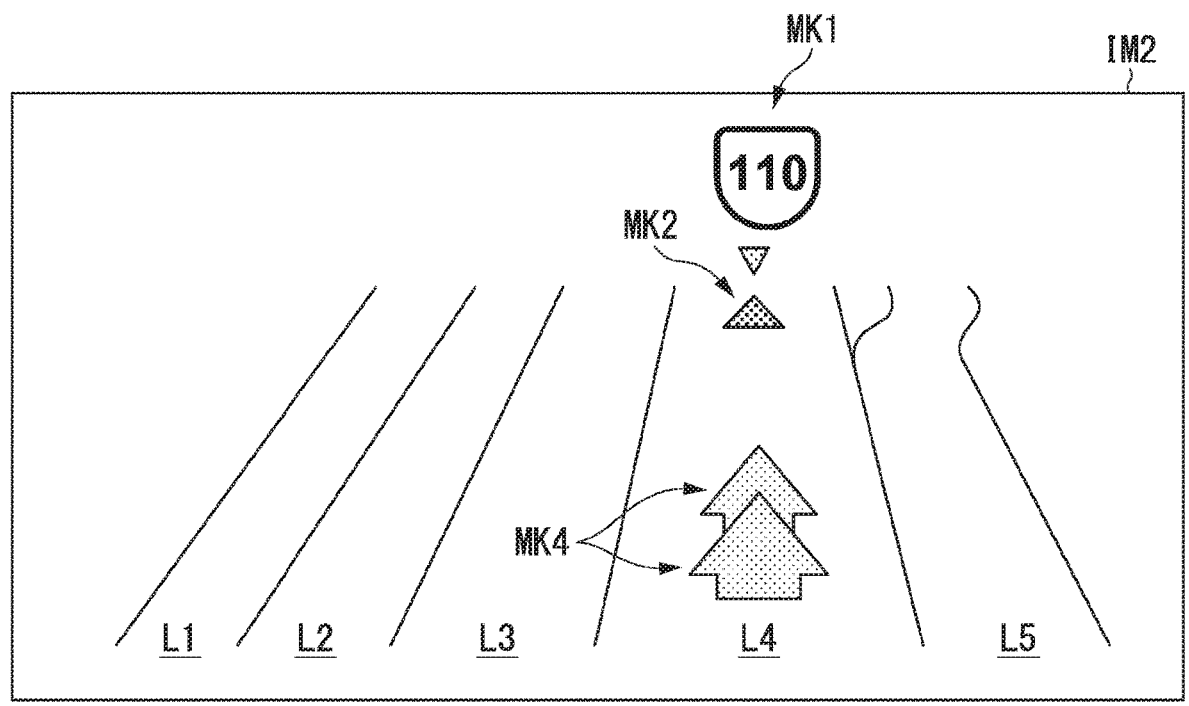
FIG. 7 is a diagram showing an example of a second route guidance image.

FIG. 7 is a diagram showing an example of the second route guidance image IM2. For example, the second route guidance image IM2 is an image including lane lines that divide lanes L1 to L5, a sign mark MK1, a recommended lane mark MK2, and a lane change unnecessary mark (lane keeping mark) MK4 as elements.

The lane change unnecessary mark MK4 is a mark that, when the traveling lane of the vehicle M and the recommended lane are the same, prompts the driver to continue traveling in the current traveling lane. For example, similar to the lane change mark MK3, the lane change unnecessary mark MK4 may be represented by an arrow symbol. In the shown example, the recommended lane L4 in which the recommended lane mark MK2 is disposed is the traveling lane of the vehicle M. In this case, the lane change unnecessary mark MK4 is disposed such that a direction indicated by the arrow is substantially parallel to the extending direction of the traveling lane L4. In the shown example, the lane change unnecessary mark MK4 is formed of a combination of two arrows. However, the present invention is not limited to this and the lane change unnecessary mark MK4 may be formed of one arrow or three or more arrows. The lane change unnecessary mark MK4 is an example of the "third element."

[Process Flow]

Figure 8:
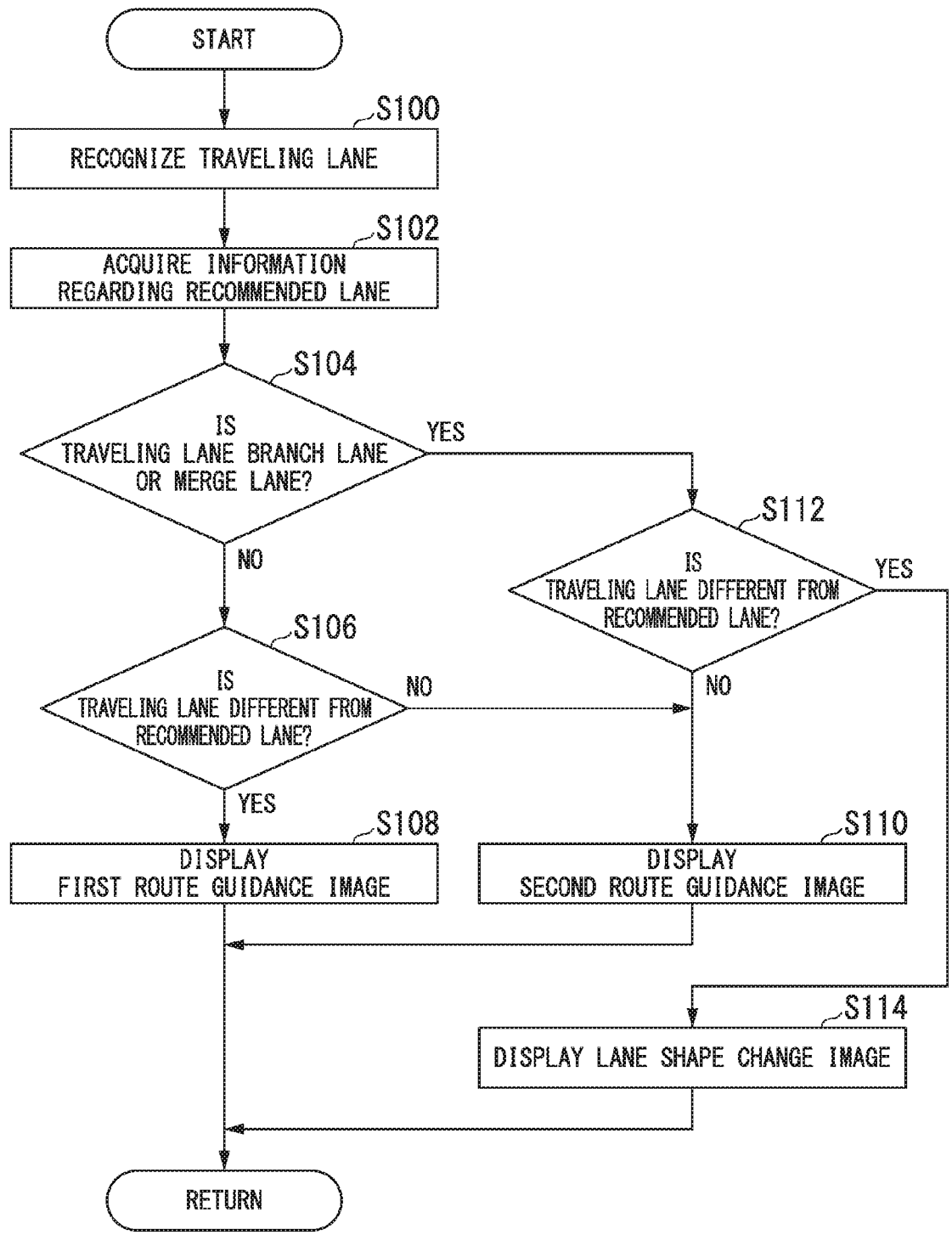
FIG. 8 is a flowchart showing an example of a flow of a series of processes performed by the HMI controller in the embodiment.

Hereinafter, a flow of a series of processes performed by the HMI controller 150 will be described. FIG. 8 is a flowchart showing an example of a flow of a series of processes performed by the HMI controller 150 in an embodiment. The process of this flowchart may be repeated, for example, at a predetermined cycle.

First, the recognizer 151 recognizes the traveling lane of the vehicle M on the basis of information input from the object recognition device 16 (step S100). Next, the acquirer 152 acquires information on a recommended lane from the navigation device 50 (step S102).

Next, the determiner 153 determines whether or not the traveling lane of the vehicle M recognized by the recognizer 151 is a branch lane or a merge lane (step S104).

Upon determining that the traveling lane of the vehicle M is not a branch lane or a merge lane, the determiner 153 further determines whether or not the traveling lane of the vehicle M recognized by the recognizer 151 and the recommended lane indicated by the information acquired by the acquirer 152 (the recommended lane determined by the route determiner 53) are different (step S106).

When the determiner 153 has determined that the traveling lane of the vehicle M is not a branch lane or a merge lane and that the traveling lane of the vehicle M and the recommended lane are different, the output controller 154 causes the HMI 80 to display the first route guidance image IM1 as shown in FIG. 5 described above (step S108).

On the other hand, when the determiner 153 has determined that the traveling lane of the vehicle M is not a branch lane or a merge lane and that the traveling lane of the vehicle M and the recommended lane are not different, i.e., are the same, the output controller 154 causes the HMI 80 to display the second route guidance image IM2 as shown in FIG. 7 described above (step S110).

On the other hand, upon determining in the determination process of S104 that the traveling lane of the vehicle M is a branch lane or a merge lane, the determiner 153 further determines whether or not the traveling lane of the vehicle M recognized by the recognizer 151 and the recommended lane indicated by the information acquired by the acquirer 152 (the recommended lane determined by the route determiner 53) are different, similar to the determination process of S106 (step S112).

When the determiner 153 has determined that the traveling lane of the vehicle M is a branch lane or a merge lane and that the traveling lane of the vehicle M and the recommended lane are different, the output controller 154 causes the HMI 80 to display a lane shape change image IM3 instead of displaying the first route guidance image IM1 or the second route guidance image IM2 (step S114). The lane shape change image IM3 is an image for providing guidance informing the driver that a branch point Pa or a merge point Pb is present ahead in the travel direction of the vehicle M. From another point of view, the lane shape change image IM3 is a screen (a lane change alerting screen) for prompting the driver to change lanes more strongly than the first route guidance image IM1 does. The lane shape change image IM3 is an example of the "second image."

Figure 9:
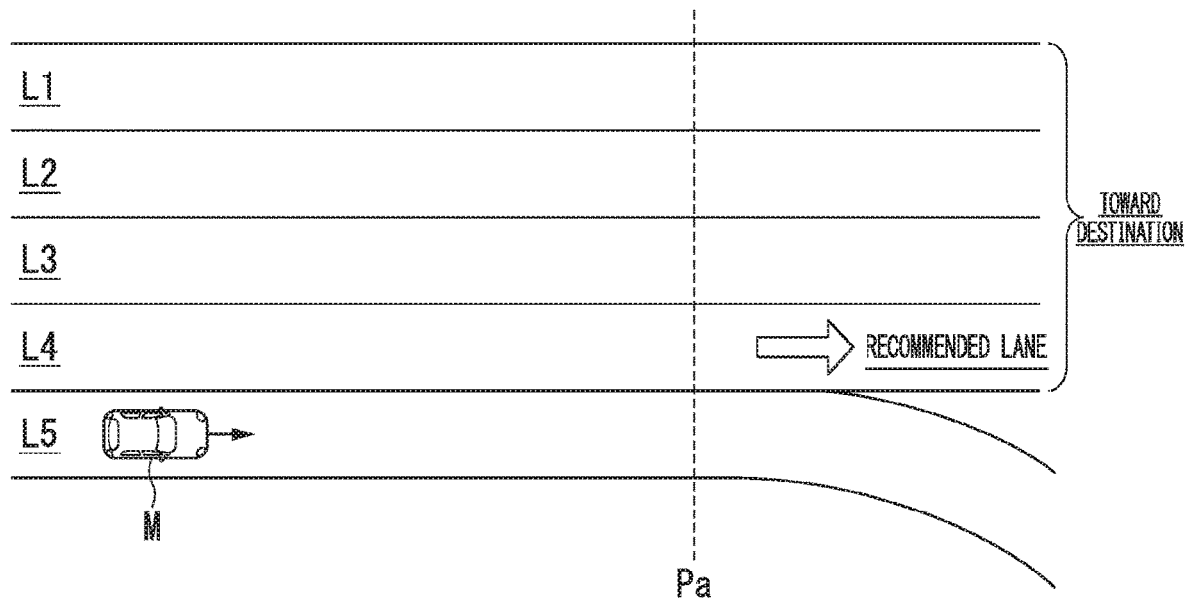
FIG. 9 is a diagram showing another example of a situation in which a branch point is present on a target route.

FIG. 9 is a diagram showing another example of a situation in which a branch point Pa is present on a target route. In the shown example, the vehicle M is traveling in a lane L5 which is a branch lane among five lanes L1 to L5 included in the target route. That is, the branch lane L5 is the traveling lane of the vehicle M. The shown example indicates that the lane L4 is a recommended lane.

In such a situation, the determiner 153 determines that the traveling lane L5 is a branch lane and is not the recommended lane. When the determiner 153 has determined that the traveling lane is a branch lane and is not the recommended lane in the situation in which the branch point Pa is present on the target route, the output controller 154 causes at least one display device among the HUD 82 of the HMI 80 or the meter display 84A to display a lane shape change image IM3.

Figure 10:
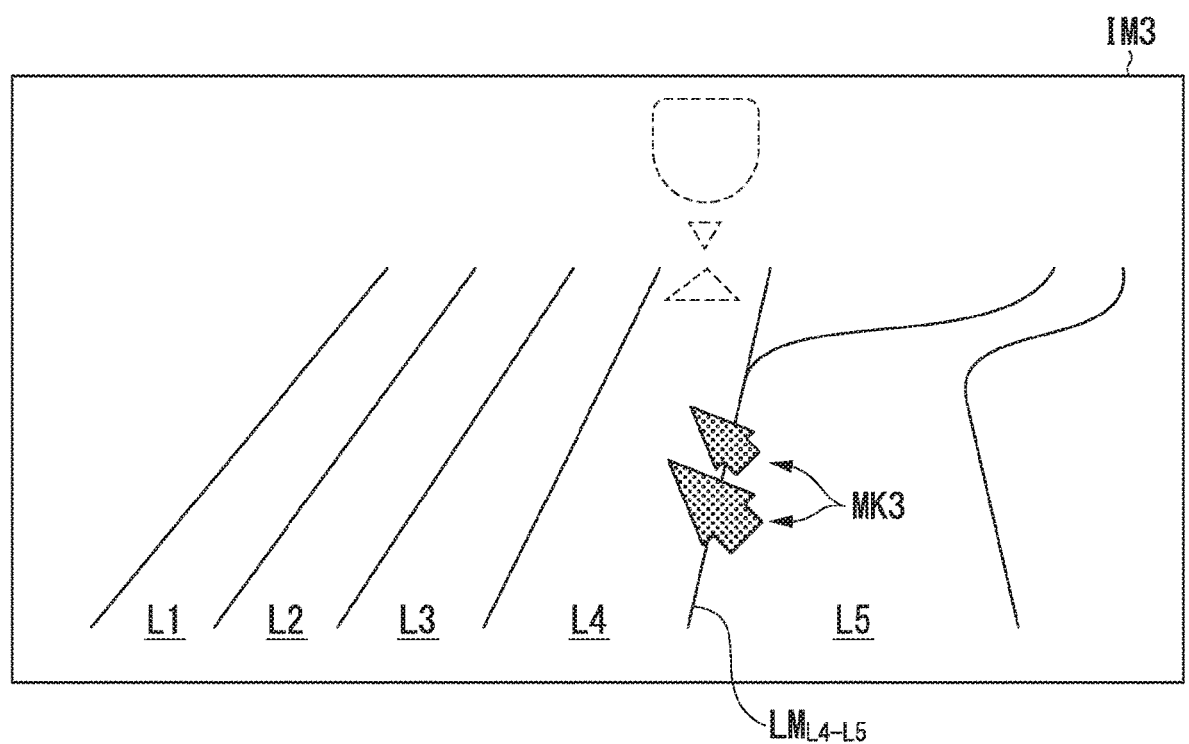
FIG. 10 is a diagram showing an example of a lane shape change image displayed in a situation in which a branch point is present on a target route.

FIG. 10 is a diagram showing an example of a lane shape change image IM3 displayed in a situation in which a branch point Pa is present on a target route. For example, in a situation in which a branch point Pa is present on the target route, a lane shape change image IM3 is displayed as an image including lane lines that divide lanes L1 to L5 and a lane change mark MK3 as elements (objects), while image elements such as the sign mark MK1 and the recommended lane mark MK2 included in the first route guidance image IM1 and the second route guidance image IM2 described above are omitted. As in the shown example, the lane change mark MK3 is represented by an arrow symbol. In the shown example, the recommended lane is the lane L4 adjacent to the left side of the traveling lane L5. Therefore, the lane change mark MK3 is disposed such that a direction indicated by the arrow is inclined to the left with respect to the current travel direction of the vehicle M. In other words, the lane change mark MK3 is expressed by an arrow (an example of the first arrow) that indicates a direction toward the lane L4 adjacent to the branch lane L5. At this time, the arrow representing the lane change mark MK3 is disposed over both the traveling lane L5 and the lane L4 adjacent to the traveling lane L5 in the lane shape change image IM3. Specifically, the lane change mark MK3 is disposed in the lane shape change image IM3 such that a part of the arrow representing the lane change mark MK3 overlaps a lane line $LM_{L4-L5}$ that divides the traveling lane L5 and the lane L4 from each other. In other words, the lane change mark MK3 is disposed in the lane shape change image IM3 such that a part of the arrow overlaps the lane L4 and the remaining part overlaps the traveling lane L5. Further, the arrow representing the lane change mark MK3 may be displayed in an alerting color such as red, orange, or yellow to express a stronger degree of alerting than the first arrow or the like does. The alerting color such as red, orange or yellow is an example of the "predetermined color."

Figure 11:
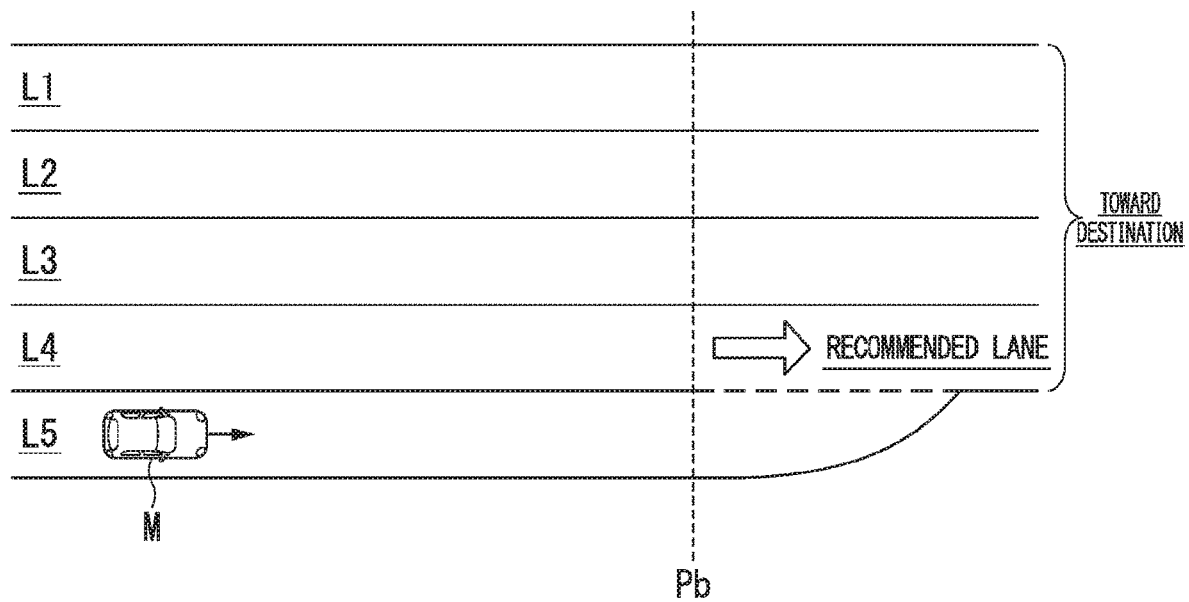
FIG. 11 is a diagram showing an example of a situation in which a merge point is present on a target route.

FIG. 11 is a diagram showing an example of a situation in which a merge point Pb is present on a target route. In the shown example, the vehicle M is traveling in a lane L5 which is a merge lane among five lanes L1 to L5 included in the target route. That is, the merge lane L5 is the traveling lane of the vehicle M. The shown example indicates that the lane L4 is a recommended lane.

In such a situation, the determiner 153 determines that the traveling lane L5 is a merge lane and is not the recommended lane. When the determiner 153 has determined that the traveling lane is a merge lane and is not the recommended lane in the situation in which the merge point Pb is present on the target route, the output controller 154 causes at least one display device among the HUD 82 of the HMI 80 or the meter display 84A to display a lane shape change image IM3.

Figure 12:
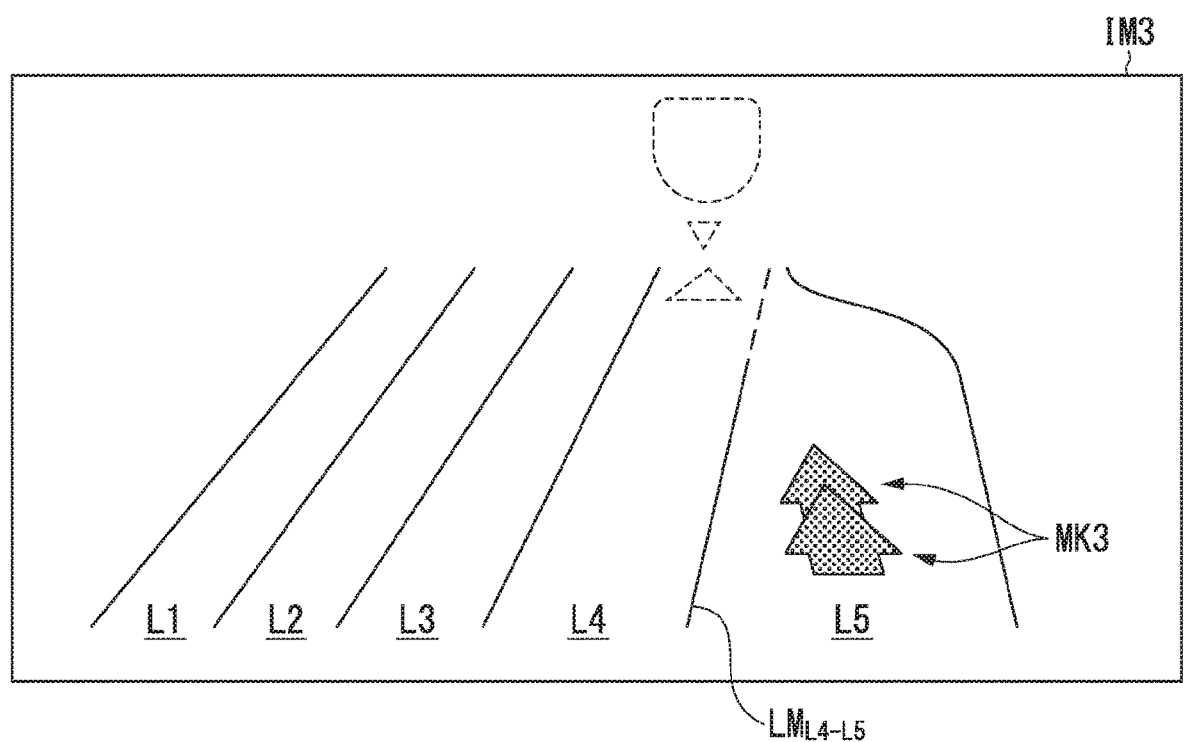
FIG. 12 is a diagram showing an example of a lane shape change image displayed in a situation in which a merge point is present on a target route.

FIG. 12 is a diagram showing an example of a lane shape change image IM3 displayed in a situation in which a merge point Pb is present on a target route. For example, in a situation in which a merge point Pb is present on the target route, a lane shape change image IM3 is displayed as an image including lane lines that divide lanes L1 to L5 and a lane change mark MK3 as elements (objects), while image elements such as the sign mark MK1 and the recommended lane mark MK2 included in the first route guidance image IM1 and the second route guidance image IM2 described above are omitted, similar to the situation in which a branch point Pa is present on the target route. In the example of FIG. 12, the recommended lane is the lane L4 adjacent to the left side of the traveling lane L5, and thus the lane change mark MK3 is disposed such that a direction indicated by the arrow is inclined to the left with respect to the current travel direction of the vehicle M, similar to the example of FIG. 10. In other words, the lane change mark MK3 is expressed by an arrow (an example of the second arrow) that indicates a direction toward the lane L4 adjacent to the merge lane L5. At this time, the arrow representing the lane change mark MK3 is not disposed over both the traveling lane L5 and the lane L4 adjacent to the traveling lane L5 in the lane shape change image IM3, unlike in the situation in which a branch point Pa is present on the target route. Specifically, the lane change mark MK3 is disposed in the lane shape change image IM3 such that a part of the arrow representing the lane change mark MK3 does not overlap a lane line $LM_{L4-L5}$ that divides the traveling lane L5 and the lane L4 from each other. In other words, the lane change mark MK3 is disposed in the lane shape change image IM3 such that the entirety of the arrow overlaps the traveling lane L5.

Figure 13:
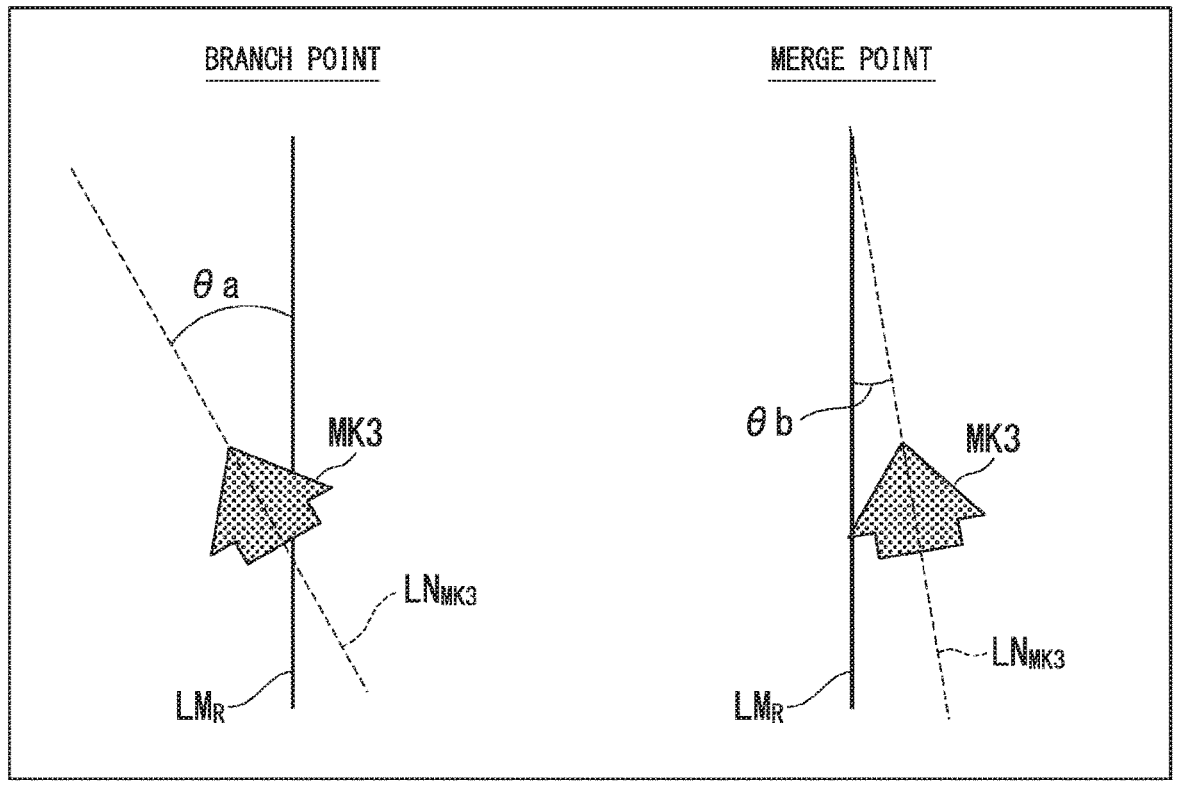
FIG. 13 is a diagram comparing lane change marks displayed in the situation in which the branch point is present on the target route and the situation in which the merge point is present on the target route.

FIG. 13 is a diagram comparing the lane change marks MK3 displayed in the situation in which the branch point Pa is present on the target route and the situation in which the merge point Pb is present on the target route. As in the shown example, the inclination of the arrow of the lane change mark MK3 displayed in the situation in which the branch point Pa is present on the target route is greater than that of the arrow of the lane change mark MK3 displayed in the situation in which the merge point Pb is present on the target route. Specifically, the arrows of lane change marks MK3 are disposed such that an angle θa formed between a virtual line $LN_{MK3}$ and a reference lane line $LM_R$ in a situation in which a branch point Pa is present on the target route is greater than an angle θb formed between a virtual line $LN_{MK3}$ and a reference lane line $LM_R$ in a situation in which a merge point Pb is present on the target route. The virtual line $LN_{MK3}$ is a virtual line that defines the direction of the arrow representing the lane change mark MK3 as a one-dimensional straight line and the reference lane line $LM_R$ is a lane line that extends between the traveling lane and the adjacent lane to divide the two lines. For example, the reference lane line $LM_R$ is the lane line $LM_{L4-L5}$ described above. In the situation in which the branch point Pa is present, it is possible to prompt the driver to change lanes more strongly than in the situation in which the merge point Pb is present such that the vehicle M does not deviate from the target route, by providing a display mode such that the inclination of the arrow of the lane change mark MK3 is greater than in the situation in which the merge point Pb is present as described above. On the other hand, the arrow of the lane change mark MK3 in the situation in which the merge point Pb is present is set to an angle nearly parallel to the merge angle of the merge lane, more than in the situation in which the branch point Pa is present. In other words, the arrows of the lane change marks MK3 are displayed such that the angle θb formed between the virtual line $LN_{MK3}$ and the reference lane line $LM_R$ is substantially zero. This makes the occupant of the vehicle M aware of the merge angle, which he or she can easily reflect in the driving operation.

Returning to the description of FIG. 8, when the determiner 153 has determined in the determination process of S104 that the traveling lane of the vehicle M is a branch lane or a merge lane and in the determination process of S112 that the traveling lane of the vehicle M and the recommended lane are not different, i.e., are the same, the output controller 154 proceeds to the process of S110 to cause the HMI 80 to display the second route guidance image IM2 as shown in FIG. 7 described above. Then, the process of this flowchart ends.

Figure 14:
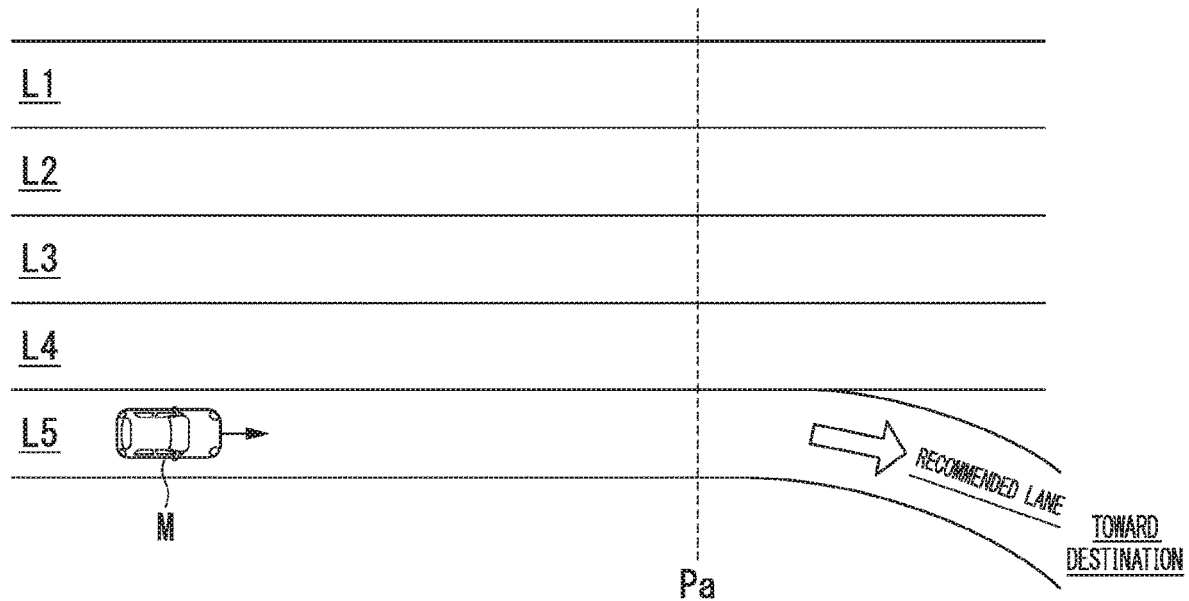
FIG. 14 is a diagram showing another example of a situation in which a branch point is present on a target route.

FIG. 14 is a diagram showing another example of a situation in which a branch point Pa is present on a target route. In the shown example, the vehicle M is traveling in a lane L5 which is a branch lane among five lanes L1 to L5 included in the target route. That is, the branch lane L5 is the traveling lane of the vehicle M. The shown example indicates that the branch lane L5 is a recommended lane.

For example, when in the situation shown in FIG. 9, the driver has changed the destination or all or a part of the target route such that the branch lane L5 goes to the destination by operating the inputter 88 or the navigation HMI 52, the traveling lane becomes a branch lane and the recommended lane as shown in FIG. 14. In this case, the determiner 153 determines that the traveling lane is a branch lane and is the recommended lane. In response to this, the output controller 154 causes the HMI 80 to display the second route guidance image IM2.

Figure 15:
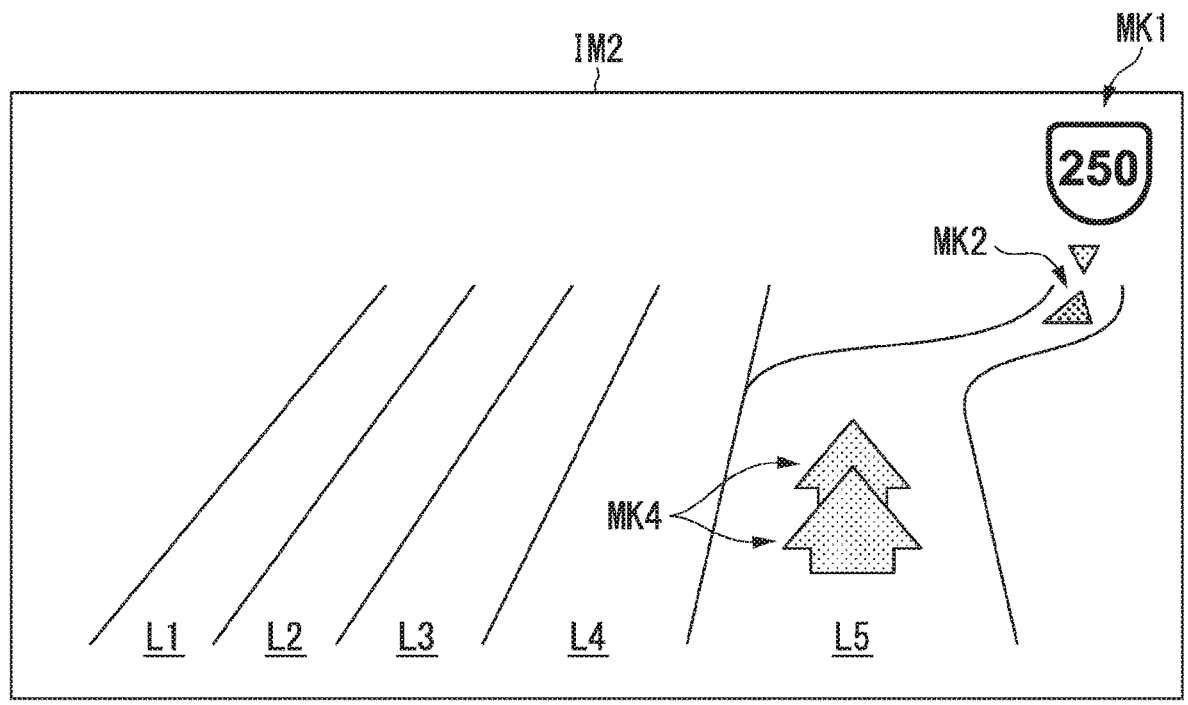
FIG. 15 is a diagram showing an example of a second route guidance image displayed in the situation shown in FIG. 14.

FIG. 15 is a diagram showing an example of the second route guidance image IM2 displayed in the situation shown in FIG. 14. In the situation shown in FIG. 14, the branch lane L5 has changed to a lane of a route to the destination. Therefore, a recommended lane mark MK2 is disposed on the branch lane L5, a sign mark MK1 is disposed above the branch lane L5 on which the recommended lane mark MK2 is disposed, and a lane change unnecessary mark MK4 is disposed on the branch lane L5. Thereby, it is possible to prompt the driver to maintain the current lane L5 without changing to another lane.

According to the embodiment described above, the HMI 80 configured to display an image, the output controller 154 configured to cause the HMI 80 to display a first route guidance image IM1 or a second route guidance image IM2 in one or more lanes included in a target route which is a route to the destination of the vehicle M, and the determiner 153 configured to determine whether or not a traveling lane in which the vehicle M is present among the one or more lanes included in the target route is a branch lane or a merge lane are provided, wherein the output controller 154 is configured to cause the HMI 80 to display a lane shape change image IM3 indicating that a branch point Pa is present ahead in the travel direction of the vehicle M without displaying the first route guidance image IM1 or the second route guidance image IM2 when the determiner 153 has determined that the traveling lane is a branch lane (an example of the first case), and is configured to cause the HMI 80 to display a lane shape change image IM3 indicating that a merge point Pb is present ahead in the travel direction of the vehicle M without displaying the first route guidance image IM1 or the second route guidance image IM2 when the determiner 153 has determined that the traveling lane is a merge lane (an example of the second case). Therefore, it is possible to make the driver easily recognize the lane change guidance information (the lane change mark MK3) which is a piece of important information for driving support. As a result, it is possible to make the driver immediately get the timing and when to change lanes.

[Hardware Configuration]

Figure 16:
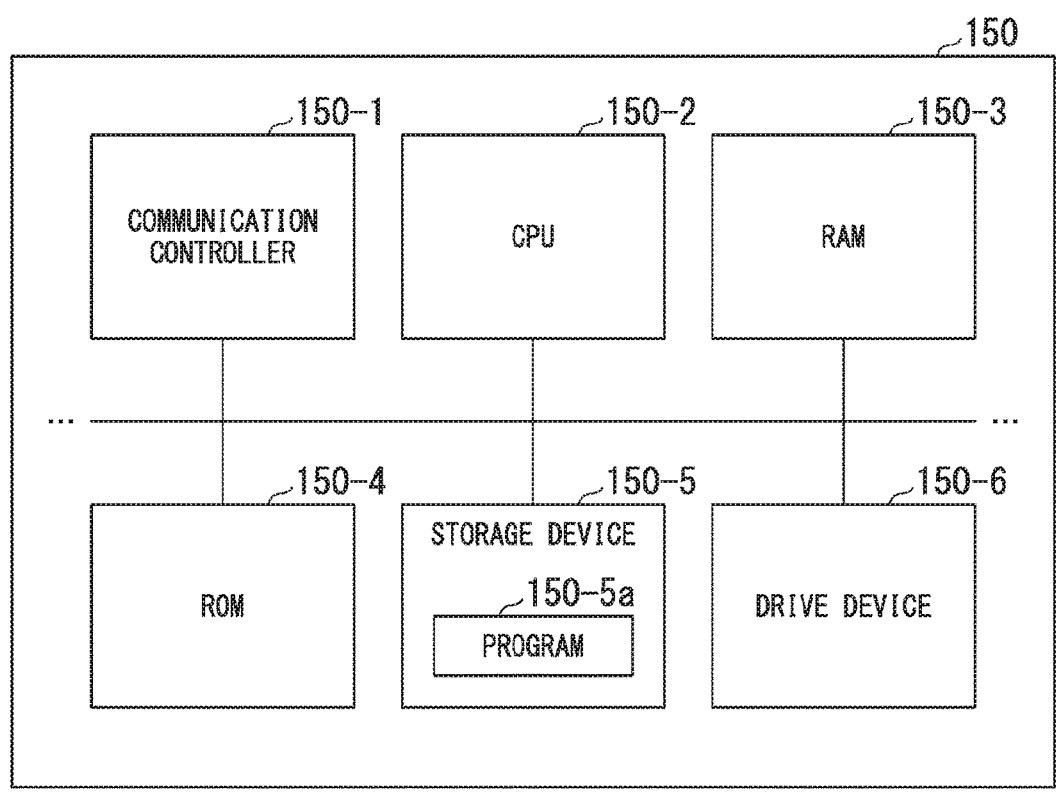
FIG. 16 is a diagram showing an example of a hardware configuration of the HMI controller of the embodiment.

The HMI controller 150 of the embodiment described above is realized, for example, by a hardware configuration as shown in the following drawing. FIG. 16 is a diagram showing an example of the hardware configuration of the HMI controller 150 according to an embodiment.

The HMI controller 150 is configured such that a communication controller 150-1, a CPU 150-2, a RAM 150-3, a ROM 150-4, a storage device 150-5 such as a flash memory or an HDD, and a drive device 150-6 are connected to each other via an internal bus or a dedicated communication line. A portable storage medium such as an optical disc is mounted in the drive device 150-6. A program 150-5a stored in the storage device 150-5 is loaded in the RAM 150-3 by a DMA controller (not shown) or the like and then executed by the CPU 150-2, thereby realizing the functional units of the HMI controller 150. The program referred to by the CPU 150-2 may be stored in a portable storage medium mounted in the drive device 150-6 or may be downloaded from another device via a network NW.

The above embodiment can be expressed as follows.

A display device includes:
a display;
a processor; and
a storage configured to store the program,
wherein the processor executes the program to:
cause the display to display a first image indicating at least one of route information and road information in one or more lanes included in a route to a destination of a vehicle;
determine that a traveling lane in which the vehicle is present among the one or more lanes is a branch lane which branches from the route or a merge lane which merges into another lane among the one or more lanes; and
cause the display to display a second image indicating that a branch point or a merge point is present ahead in a travel direction of the vehicle without displaying the first image upon determining that the traveling lane is the branch lane or the merge lane.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display device comprising:
a display configured to display an image;
a display controller configured to cause the display to display a first image indicating at least one of route information and road information on a route to a destination of a vehicle; and
a determiner configured to determine that a traveling lane in which the vehicle is present among one or a plurality of lanes included in the route is a branch lane which branches from the route or a merge lane which merges into another lane,
wherein the display controller is configured to cause the display to display a second image indicating that a branch point or a merge point is present ahead in a travel direction of the vehicle without displaying the first image when the determiner has determined that the traveling lane is the branch lane or the merge lane,
wherein the display controller is configured to cause the display to display the second image including, as an element, a first arrow indicating a direction from the branch lane to a first adjacent lane which is adjacent to the branch lane in a first case where the determiner has determined that the traveling lane is the branch lane, and to cause the display to display the second image including, as an element, a second arrow indicating a direction from the merge lane to a second adjacent lane which is adjacent to the merge lane in a second case where the determiner has determined that the traveling lane is the merge lane,
wherein the display controller is configured to make an angle formed between a virtual line in the direction indicated by the first arrow and the first adjacent lane greater than an angle formed between a virtual line in the direction indicated by the second arrow and the second adjacent lane.

2. The display device according to claim 1, wherein the display controller is configured to cause the display to display the first image including some or all of:
- a first element indicating a road sign of at least a recommended lane in which the vehicle is to travel among the one or plurality of lanes included in the route;
- a second element indicating that the vehicle is to change lanes to the recommended lane from the traveling lane when the traveling lane and the recommended lane are different;
- a third element indicating that the vehicle is to continue traveling in the traveling lane when the traveling lane and the recommended lane are the same; and
- a fourth element indicating a relative position of the recommended lane with respect to another lane among the one or plurality of lanes.

3. The display device according to claim 1, wherein the display controller is configured to make a part of the first arrow overlap the first adjacent lane and make an entirety of the second arrow overlap the merge lane in the second image.

4. The display device according to claim 1, wherein the display controller is configured to display the second arrow at an angle nearly parallel to a merge angle of the merge lane.

5. The display device according to claim 1, wherein the display controller is configured to display the second arrow in a predetermined color for alerting an occupant of the vehicle more strongly than the first arrow does.

6. The display device according to claim 1, further comprising an inputter configured to receive an operation from an occupant of the vehicle,
- wherein the display controller is configured to cause the display to display the first image without displaying the second image when an operation of setting the destination to a point connected from the branch lane has been input to the inputter and the determiner has determined that the traveling lane is the branch lane.

7. A display control method for a computer mounted in a vehicle including a display configured to display an image, the display control method comprising:
- the computer causing the display to display a first image indicating at least one of route information and road information on a route to a destination of a vehicle;
- determining that a traveling lane in which the vehicle is present among one or a plurality of lanes included in the route is a branch lane which branches from the route or a merge lane which merges into another lane;
- causing the display to display a second image indicating that a branch point or a merge point is present ahead in a travel direction of the vehicle without displaying the first image upon determining that the traveling lane is the branch lane or the merge lane;
- causing the display to display the second image including, as an element, a first arrow indicating a direction from the branch lane to a first adjacent lane which is adjacent to the branch lane in a first case where the determiner has determined that the traveling lane is the branch lane;
- causing the display to display the second image including, as an element, a second arrow indicating a direction from the merge lane to a second adjacent lane which is adjacent to the merge lane in a second case where the determiner has determined that the traveling lane is the merge lane; and
- making an angle formed between a virtual line in the direction indicated by the first arrow and the first adjacent lane greater than an angle formed between a virtual line in the direction indicated by the second arrow and the second adjacent lane.

8. A computer readable non-transitory storage medium storing a program for causing a computer mounted in a vehicle including a display configured to display an image to execute:
- causing the display to display a first image indicating at least one of route information and road information on a route to a destination of a vehicle;
- determining that a traveling lane in which the vehicle is present among one or a plurality of lanes included in the route is a branch lane which branches from the route or a merge lane which merges into another lane;
- causing the display to display a second image indicating that a branch point or a merge point is present ahead in a travel direction of the vehicle without displaying the first image upon determining that the traveling lane is the branch lane or the merge lane;
- causing the display to display the second image including, as an element, a first arrow indicating a direction from the branch lane to a first adjacent lane which is adjacent to the branch lane in a first case where the determiner has determined that the traveling lane is the branch lane;
- causing the display to display the second image including, as an element, a second arrow indicating a direction from the merge lane to a second adjacent lane which is adjacent to the merge lane in a second case where the determiner has determined that the traveling lane is the merge lane; and
- making an angle formed between a virtual line in the direction indicated by the first arrow and the first adjacent lane greater than an angle formed between a virtual line in the direction indicated by the second arrow and the second adjacent lane.

* * * * *